United States Patent [19]

Lukas

[11] 4,109,467

[45] Aug. 29, 1978

[54] HYDRAULIC BOOSTER SYSTEM

[76] Inventor: George N. Lukas, 2242 W. Belmont Ave., Chicago, Ill. 60618

[21] Appl. No.: 703,282

[22] Filed: Jul. 7, 1976

[51] Int. Cl.[2] .............................................. B60T 17/22

[52] U.S. Cl. ........................................ 60/534; 60/547; 60/585; 60/592; 60/593; 137/498

[58] Field of Search ................. 60/592, 547, 593, 585, 60/534; 137/498

[56] References Cited

U.S. PATENT DOCUMENTS

| | | | |
|---|---|---|---|
| 1,389,300 | 8/1921 | Gasche | 60/592 |
| 2,583,384 | 1/1952 | Mercier | 137/498 |
| 3,441,052 | 4/1969 | Schilling | 137/498 |
| 3,476,141 | 11/1969 | Tillman | 137/498 |
| 3,513,656 | 5/1970 | Engle | 60/592 |
| 3,575,204 | 4/1971 | McMurry | 137/498 |
| 3,837,443 | 9/1974 | Clemmons | 188/153 R |
| 3,913,328 | 10/1975 | Shaffer | 60/592 |

FOREIGN PATENT DOCUMENTS

| | | | |
|---|---|---|---|
| 927,366 | 5/1946 | France | 60/585 |
| 479,679 | 4/1953 | Italy | 60/585 |

*Primary Examiner*—Martin P. Schwadron
*Assistant Examiner*—Abraham Hershkovitz

[57] ABSTRACT

A hydraulic booster unit and system for use in operating hydraulic units, such as work holding hydraulic cylinders, from a compressed air power source is disclosed. The booster includes a unique refill unit that automatically feeds hydraulic fluid from a reservoir to the booster to replace lost fluid during use, and also includes an alerter for giving warning on the onset of a low fluid condition (such as may occur from an exhausted reservoir or excessive leak), and thus protects against excessive leakage as well as the dangers to the work piece and worker inerent in a low fluid condition. The alerter may be a visual unit or a compressed air-operated audible alarm or both.

5 Claims, 3 Drawing Figures

HYDRAULIC BOOSTER SYSTEM

FIELD OF THE INVENTION

The present invention relates to improvements in compressed air-driven hudraulic cylinders, termed "boosters" in the machine tool work holding art.

BACKGROUND OF THE INVENTION

In a machine shop practice it is often necessary to repeat the same machine operating on a large number of workpieces, and powered workholders over hand-operated vices and the like has become widely accepted. These units require less physical effort by the machine tool operator, are faster, and are less likely to misalign or mis-grip a part. Examples of such holders are disclosed in U.S. Pat. No. 3,087,736, entitled "Collet Operator", issued to the present inventor, George N. Lukas, as well as in U.S. Pat. No. 3,338,573, entitled "Fluid Operated Vice" also issued to the present inventor, George N. Lukas.

Such pieceholders and like hydraulic force units are commonly driven by a booster unit which is a compressed air to hydraulic fluid transducer. By controlling the application of compressed air to the booster, hydraulic pressure in a line from the booster to the force unit is controlled, which, in turn, drives the workpiece holder or like force unit. Such a system using quick connectors has a great deal of flexibility and allows numerous connections and reconnections of the fluid and air hoses for numerous applications.

However, there are also some disadvantages to such a system which relate to the inherent nature of a hydraulic system to leak and the physical capacities of the units to displace hydraulic fluid. As long as the hydraulic fluid displaced in the power unit is moving from its retracted state to its maximum position is less than the effective volume of fluid in the hydraulic cylinder of the booster, the workpiece holder will, upon command, travel the required distance and exert great force against the workpiece. However, if that volume of fluid is just slightly under the needed volume, the unit travels to the workpiece, but the holding force drops off dramatically. The result is a loosely held piece which is undergoing machining. This can result in great damage to the workpiece, the machine tool, and, in certain circumstances, danger to the machine operator and others in the area.

DETAILED DESCRIPTION

Figures 1, 2, 3:
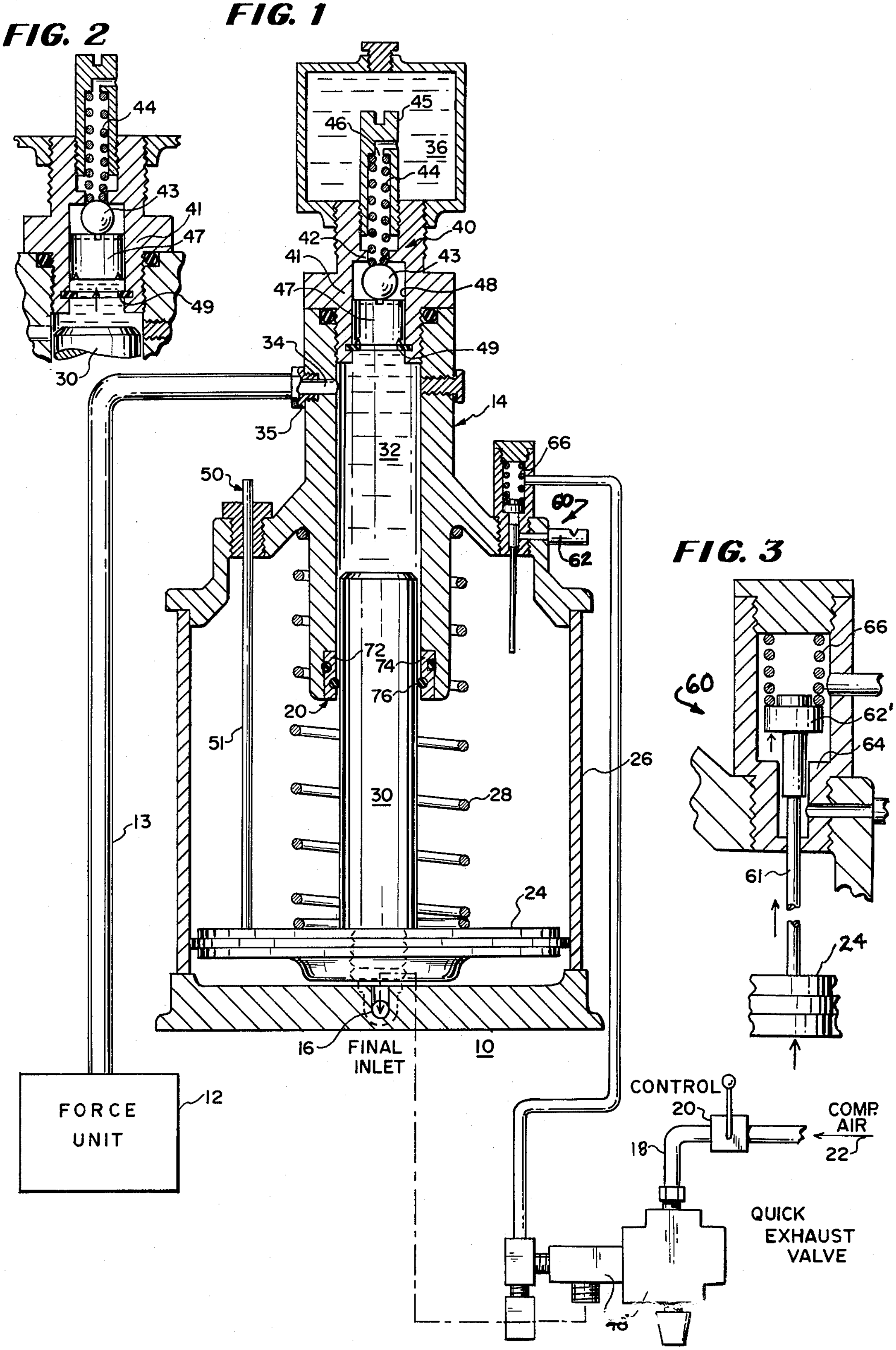
FIG. 1 is a schematic depiction of a booster-force unit system constructed in accordance with the present invention wherein the booster unit is shown in section to reveal interior parts.
FIG. 2 is a sectional view of one portion, the hydraulic fluid automatic feed mechanism, of the booster of FIG. 1 showing parts in a moved position.
FIG. 3 is, on an enlarged scale, a sectional view of one portion of the booster of FIG. 1.

Referring to FIG. 1, there is depicted a power-booster-force unit system which is generally designated by the numeral 10. The system 10 includes a force unit 12 which may be, for example, one of the units described in the aforementioned U.S. Pat. No. 3,338,573, and a booster 14 constructed in accordance with the present invention. The booster 14 and force unit 12 are interconnected by means of a hydraulic line 13, which most commonly would be of flexible tubing. The booster 14, as is conventional, includes an air line input 16 to which an air line 18 is connected. The line 18 is connected through a suitable control 20 to a source of compressed air 22. An example of suitable control 20 is a foot operated, three-way valve such as the commercially available Dee-Sta-Co. Model 70909.

The booster 14 includes an air piston 24 which is sealably mounted for movement within a cylinder 26. Operation of control 20 provides air pressure from source 22 through line 18, unti 48 to be explained below, and inlet 16 to the bottom side of the piston 24. This tends to drive the piston 24 upward to compress a return spring 28. Mounted on the air piston 24 is an oil piston 30 which is mounted for movement upward into an oil cylinder 32.

Oil pressure and displaced oil is communicated from the cylinder 32 via an exit porting 34 which may include one or more quick connection couplings such as coupling 35 connected to oil line 13. The pressure and displaced oil is thus coupled from the line 13 to the force unit 12 to operate that unit.

Mounted at the top of the booster 14 is a hydraulic oil reserve 36. In accordance with the present invention, there is provided between the reserve 36 and the upper part of the hydraulic circuitry of the booster 14 a novel automatic filling valve unit which is generally referred to by the number 40.

The valve unit 40 includes a body 41 in which is defined a narrow flange shoulder 42 upon which a ball 43 may become seated to seal off the reservoir from the hydraulic circuit below. The ball 43 is normally held away from shoulder 42 by means of spring 44, which is seated on a spring pressure adjusting unit 45, which also serves to define passageway 46 between valve body 41 and the reservoir 36. Below the ball 40 is a cylindrical piston 47, which is sized and constructed to fit relatively loosely in cylinder bore 48 found in body 41. The fit is such as to allow hydraulic fluid and air bubbles therein to flow between the walls of bore 48 and piston 47. Piston 47 is secured in body 41 by a snap ring 49, so that upon an increase in oil pressure in cylinder 32, the piston 47 and the ball 42 are driven upward, as shown in FIG. 2, compressing spring 44 and closing off reservoir 36 from the fluid circuit.

However, absent the operation of control 20 to drive cylinder 30 upward to pressurize the hydraulic circuit, valve 40 is opened to allow oil to drain into the system so as to replace any small losses and also to allow air bubbles to migrate upward to and through reservoir 36.

A basic problem with any air oil booster is to replenish any lost oil and/or purge air that can enter the system. Even small oil leakage can be critical where only small volumes of fluid are utilized, which is typical of the air oil booster systems in common usage.

A normally closed check valve and reservoir can be used to furnish makeup oil as the check valve will open (to permit oil to flow from reservoir to oil chamber) as the booster ram goes down (suction). However, this added oil cannot be metered to equal leakage and when the oil returns from what are generally spring loaded force units, the excess oil will close the normally closed check valve which results in residual pressure that over a period of several operations will act to prevent the spring return units from fully opening (to release the piece parts). Additionally, a normally closed check valve prevents undesirable air from bleeding out, through the reservoir. The present valve is normally open. This permits any excess oil picked up due to booster section to discharge back into the reservoir and as it remains normally open, offers an opportunity for any air to bleed back through the reservoir. On the power stroke, any air still within the oil chamber will bypass the dummy piston which will only close when hit by a full column of oil, thus isolating the reservoir from the remainder of the system.

It is made adjustable because different kinds of boosters will suck in more oil or less oil due to differences in construction, size and spring return rate, or differences in a double acting booster when air drives or retracts the piston.

In accordance with a second feature of the invention, booster 14 is equipped with a first alerting mechanism generally indicated by the numeral 50. This means includes a plunger 51 which is restrained in the cylinder housing but is free to move from a lower position in which it is substantially hidden from view, upward to be readily visable. The plunger is preferably colored a distinctive color, such as red.

At 60 is depicted another alerter using the same principle as the plunger 50. In this case, the plunger used to actuate on an air-powered (via line) audio alarm 62 at a high position (e.g., at about 10% of the ultimate position of piston 30).

The unit 60 includes a seal 62' which is normally driven against a flange 64 by a spring 66. However, as shown in FIG. 3 where the air piston 24 has reached a high position it contacts a plunger 61 and drives the seal 62 off at its seat 64 thus opening an air path from a source of air pressure (e.g. an unnumbered tube connected to the high pressure side of the cylinder 24) to an audial alarm or whistle 62. This path is preferably so designed as to provide only a small air leakage from the cylinder 24 so as to not immediately cause a drop in oil pressure.

The unit 48' (FIG. 1) serves to connect the air pressure to the audio alarm 60 and also includes means for silencing the alarm by disconnecting air pressure to the connecting line.

Other alternative air path arrangements and alarm units can be employed without departing from at least the broader aspects of the present invention.

Although in the above described booster unit two alerting units were described, it is contemplated by the inventor only one would probably be necessary in normal operation although for extra safety two could be provided as shown.

An air/oil seal is provided at 20 between the piston 30 and the cylinder walls of cylinder 32. This seal comprises a replaceable sleeve 72 having an interior opening O-ring containing groove 74 and an exterior opening O-ring containing groove 76. The sleeve 72 fits into the bottom of the cylinder 32 at the point of most wear and serves to make changing of the O-ring and reconditioning of the unit after use easier and less costly. The sleeve 72 is held in the unit by any suitable manner, such as a tight friction fit.

The above described booster unit 14 has an additional advantage of being able to be used as a leak detector for any hydraulic system and the rate of leakage would be computed from the change in height of the visual probe 51 over time.

While a specific embodiment of the invention has been disclosed in the foregoing description, it will be understood that various modifications within the spirit of the invention may occur to those skilled in the art. It is the intention of the appended claims, therefore, to encompass such modifications.

I claim:

1. A hydraulic booster for selectively driving a power unit via a hydraulic circuit, said booster including an air cylinder, an air driven piston reciprocable in said air cylinder, air supply means for selectively energizing said air cylinder to cause reciprocation of said air driven piston, a hydraulic cylinder coaxially disposed and rigidly connected with said air cylinder, a hydraulic piston rigidly connected to said air driven piston, said hydraulic piston having a smaller cross-sectional area than said air driven piston, a body of hydraulic fluid in said hydraulic cylinder, a conduit for transferring hydraulic fluid between said hydraulic cylinder and said power unit, a hydraulic reservoir mounted in said hydraulic cylinder for replenishing the hydraulic fluid therein, a valve unit mounted in said hydraulic cylinder, externally of said hydraulic piston, said valve unit comprising a valve seat in said hydraulic cylinder, a ball movable between a normally open position away from said valve seat permitting hydraulic fluid flow between the reservoir and the hydraulic cylinder to replace any hydraulic losses in the hydraulic cylinder and to return any excess of hydraulic fluid in the hydraulic cylinder to the reservoir and to also permit any air present in the fluid in the hydraulic cylinder to migrate from the hydraulic cylinder to the reservoir, and a closed position on said valve seat preventing fluid communication in either direction between the hydraulic cylinder and the reservoir, a spring bearing on said ball to maintain it in the normally open position when the air cylinder is not energized, means for adjusting the bias of the spring, a piston positioned below the ball to automatically and directly move the ball to its closed position in response to hydraulic fluid pressure surges in the hydraulic cylinder when the air cylinder is energized.

2. A hydraulic booster for selectively driving a power unit via a hydraulic circuit, said booster including an air cylinder, an air driven piston reciprocable in said air cylinder, air supply means for selectively energizing said air cylinder to cause reciprocation of said air driven piston, a hydraulic cylinder coaxially disposed and rigidly connected with said air cylinder, a hydraulic piston rigidly connected to said air driven piston, said hydraulic piston having a smaller cross-sectional area than said air driven piston, a body of hydraulic fluid in said hydraulic cylinder, a conduit for transfering hydraulic fluid between said hydraulic cylinder and said power unit, a hydraulic reservoir mounted in said hydraulic cylinder for replenishing the hydraulic fluid therein, a valve unit mounted in said hydraulic cylinder, externally of said hydraulic piston, said valve unit comprising a valve seat in said hydraulic cylinder, a ball movable between a normally open position away from said valve seat permitting hydraulic fluid flow between the reservoir and the hydraulic cylinder to replace any hydraulic losses in the hydraulic cylinder and to return any excess of hydraulic fluid in the hydraulic cylinder to the reservoir and to also permit any air present in the fluid in the hydraulic cylinder to migrate from the hydraulic cylinder to the reservoir, and a closed position on said valve seat preventing fluid communication in either direction between the hydraulic cylinder and the reservoir, a spring bearing on said ball to maintain it in the normally open position when the air cylinder is not energized, means for adjusting the bias of the spring, a piston positioned below the ball to automatically and directly move the ball to its closed position in response to hydraulic fluid pressure surges in the hydraulic cylinder when the air cylinder is energized, and position indicating means responsive to movement of said air driven piston.

3. The combination of claim 2 wherein said position indicating means includes a probe which is driven upward by the air driven piston.

4. The combination of claim 2 wherein said position indicating means is an audio signal derived from a sounding device which is powered by air pressure derived from the same air supply means which powers the air cylinder, and wherein the rise of the air driven piston to a predetermined height causes the opening of an air passageway to said sounding device.

5. The combination of claim 3 wherein said probe is visual and extends from the air cylinder.

* * * * *